United States Patent [19]
Kolev et al.

[11] Patent Number: 6,148,176
[45] Date of Patent: Nov. 14, 2000

[54] METHODS AND SYSTEMS FOR ACQUIRING SERVICE WITHIN A SATELLITE COMMUNICATIONS SYSTEM

[75] Inventors: Javor Kolev, Cary; Carsten Hoirup, Raleigh; Larry Massingill, Selma, all of N.C.

[73] Assignee: Ericsson Inc., Research Triangle Park, N.C.

[21] Appl. No.: 09/038,866

[22] Filed: Mar. 11, 1998

[51] Int. Cl.$^7$ ........................................ H02Q 7/20
[52] U.S. Cl. .................. 455/12.1; 455/455; 455/456; 455/457; 455/429; 455/430
[58] Field of Search ............................. 455/427, 428, 455/429, 430, 12.1, 13.1, 455, 457, 435, 456

[56] References Cited

U.S. PATENT DOCUMENTS

| | | | |
|---|---|---|---|
| 5,758,260 | 5/1998 | Wiedeman et al. | 455/12.1 |
| 5,812,932 | 9/1998 | Wiedeman et al. | 455/13.1 |
| 5,907,809 | 5/1999 | Molnar et al. | 455/456 |
| 5,918,157 | 5/2000 | Wiedeman et al. | 455/13.1 |
| 5,974,314 | 10/1999 | Hudson | 455/427 |
| 5,974,315 | 10/1999 | Hudson | 455/427 |
| 6,067,442 | 5/2000 | Wiedeman et al. | 455/13.1 |

*Primary Examiner*—Daniel S. Hunter
*Assistant Examiner*—Yemane Woldetatios
*Attorney, Agent, or Firm*—Myers Bigel Sibley & Sajovec

[57] ABSTRACT

Methods and systems for acquiring service for a user terminal with a satellite communications system are provided wherein geographic information is received via an electromagnetic transmission at the user terminal defining a location of the user terminal. A control channel is selected corresponding to one of the spot beams covering the location of the user terminal using the geographic information. The user terminal acquires service from the satellite communications system over the control channel. The geographic information enables the user terminal to shorten the search time by searching those channels which correspond to the geographic region determined from the geographic information.

29 Claims, 7 Drawing Sheets

METHODS AND SYSTEMS FOR ACQUIRING SERVICE WITHIN A SATELLITE COMMUNICATIONS SYSTEM

FIELD OF THE INVENTION

The present invention relates to the field of communications and more particularly to systems and methods for satellite communications.

BACKGROUND OF THE INVENTION

Satellite communication systems may allow users to access a communications network as the user moves. Some satellite communications systems partition the service area into geographic regions wherein each geographic region is covered by a spot beam which provides communications service to user terminals located within the corresponding geographic region. The user terminal may be a radio telephone capable of communicating with the satellite communication system.

FIG. 1 illustrates a plurality of spot beams 101, 102, 103, and 104 within a satellite communications system which provide service to user terminals located in the corresponding Geographic regions within the service area 100. For example, the satellite communications system provides service to the user terminal 110 located within the corresponding geographic region via spot beam 101. The user terminal may be required to register with the satellite communications system so that service may be provided. Consequently, if the user terminal 110 moves from a first geographic region to a second geographic region within the serviced area, the user terminal 110 may stop acquiring service in the first geographic region and start acquiring the service in the second geographic region to maintain the user's access.

Each of the spot beams may broadcast system information over an associated control channel. The satellite communications system may select a different control channel for each spot beam servicing a portion of the service area. For example, the control channel frequencies and/or time slots may be different so as to reduce interference between spot beams serving proximate geographic regions. The system information may include the location area code for the serving spot beam, a list of control channels used by the satellite system, and any changes in the control channels which may be pending. As will be understood by those of ordinary skill in the art, a channel can be defined by a frequency (FDMA), a frequency and a time slot (TDMA), or other techniques known in the art.

The registration process may require a user terminal to communicate with the satellite communications system. The user terminal may, therefore, receive system information over the control channel associated with the spot beam serving the geographic region in which the user terminal is located. For example, user terminal 110 may register with the satellite communications system by receiving system information on the control channel, determining its corresponding location area code, and updating the satellite communications system with the user terminal's present location area code. The user terminal 110 may be required to re-register with the satellite communications system when the user terminal moves to another geographic region. For example, if the user terminal moves to the geographic region covered by spot beam 103, the user terminal may re-register as being serviced by spot beam 103.

The user terminal may not, however, know the correct control channel for the serving spot beam when the user terminal is powered on or enters satellite mode. Consequently, the user terminal 110 may begin searching for the correct control channel for the spot beam servicing its geographic region. The search may include scanning within a set of known control channels used by the satellite communications system for a signal of appropriate strength. The set of known control channels may be stored in the user terminal 110. For example, if user terminal 110 were powered on in the geographic region covered by spot beam 104, the user terminal 110 may scan the control channels associated with spot beams 101, 102, and 103 before selecting the control channel associated with spot beam 104. Moreover, the process of acquiring the correct control channel may be difficult. For example, in some systems according to the prior art, the user terminal may take several minutes to scan hundreds of control channels before acquiring the correct channel. The search may be required each time the user terminal is powered on in a new geographic region.

Some systems may reduce the search time by having the user input a code which identifies the location of the user terminal. The user terminal may reduce the search time by searching the control channels used in the location. This technique, however, may require the user to carry a list of location codes. Moreover, the user may be required to input the location code in a particular format which the user may not know. The user may also make an error in entering the location code. In consideration of the above discussion, there is a continued need to reduce the time for a user terminal to register with a satellite communication system.

SUMMARY OF THE INVENTION

It is, therefore, an object of the present invention to reduce the time for a user terminal to register with a satellite communications system.

It is another object of the present invention to reduce the time for a user terminal to select a control channel.

These and other objects are provided by a method of registering a user terminal with a satellite communications system defining a plurality of spot beams with each of the spot beams providing service for a different geographic region. In particular, geographic information is received at the user terminal defining a location of the user terminal via an electromagnetic transmission. A control channel is selected corresponding to one of the spot beams covering the location of the user terminal using the geographic information. The user terminal acquires service from the satellite communications system over the control channel. Accordingly, the geographic information enables the user terminal to shorten the search time by searching the channels which correspond to the geographic region identified by the geographic information.

In one embodiment, a terrestrial communications system broadcasts the geographic information defining a location of the terrestrial communications system. The geographic information is received by the user terminal which uses the geographic information to reduce the search time for a satellite service. Identifying a control channel with the geographic information from a terrestrial system may require only seconds as compared to minutes to identify a control channel from a satellite system. Searching for an appropriate satellite control channel may be difficult because the signal power is relatively low. Moreover, the present invention may be used when turning the user terminal on or when switching to satellite mode from terrestrial mode.

More particularly, the terrestrial system can be a cellular system, such as an AMPS or GSM system, which broadcasts information identifying the country where the terrestrial system is operating. The present invention, therefore, receives the geographic information as part of a standard format used in many existing cellular systems. Moreover, the user terminal need not be a subscriber to the cellular system. The geographic information may be obtained by monitoring the transmissions from the cellular system. In other words, the user terminal does not need to interact with the cellular system and, therefore, does not consume the cellular system's resources.

The user terminal can use a data table including a list of control channels used by the satellite system. The user terminal indexes into the data table using the geographic information provided to the user terminal to select a control channel.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of a hardware embodiment, a software embodiment or an embodiment combining software and hardware aspects.

Figure 1:
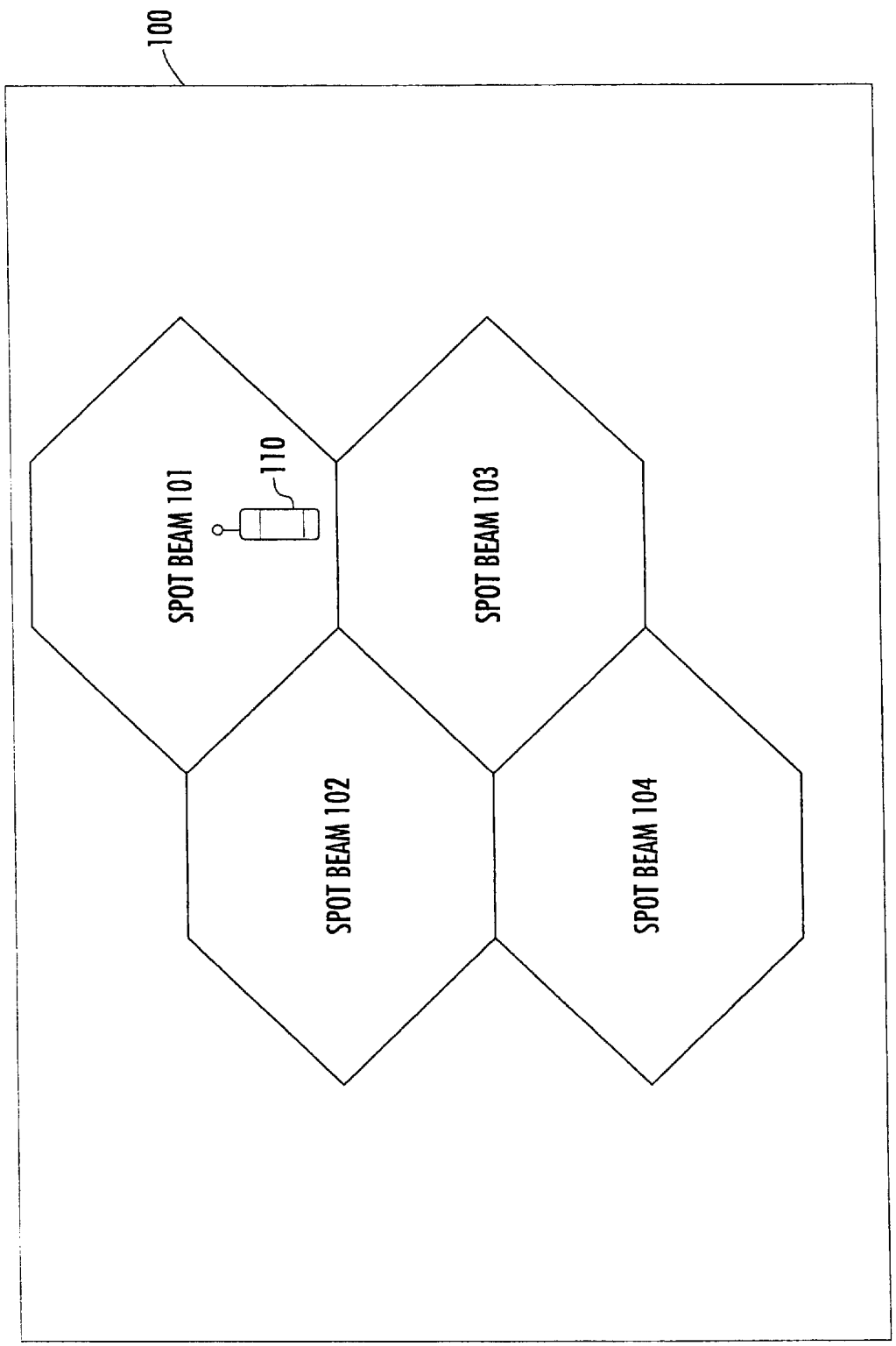
FIG. 1 is a block diagram illustrating spot beam coverage of geographic regions serviced by a satellite communication system according to the prior art.
Figure 2:
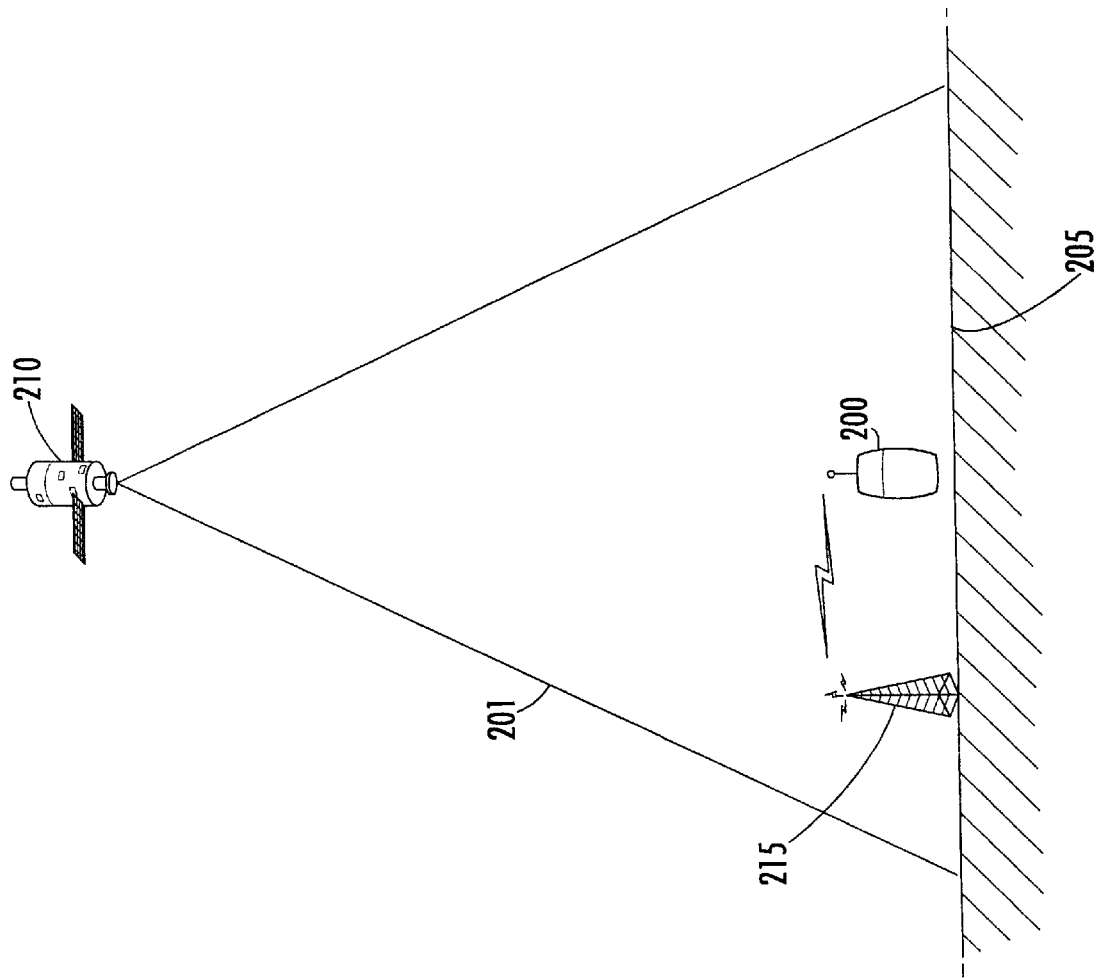
FIG. 2 is a block diagram illustrating a user terminal within a satellite communications system of the present invention.

FIG. 2 illustrates a satellite communications system utilizing the present invention. Satellite 210 projects spot beam 201 onto geographic region 205 to provide communications service to the user terminal 200. The spot beam 201 broadcasts system information on a control channel using frequency $f_c$. The system information may include communication channels for the spot beam 201, the location area code (LAC) for spot beam 201 and a list of control channels corresponding to the system's spot beams. The system information enables the user terminal to register with the system by identifying the serving spot beam. While one spot beam is illustrated, the satellite may project a plurality of spot beams to provide service to a plurality of geographic regions.

The terrestrial communications system 215 may be a cellular system which provides service to a portion of the geographic region 205. In particular, the cellular system may broadcast system information over a control channel wherein the system information includes geographic information about the location of the terrestrial service. For example, the terrestrial communications system 215 may be an AMPS cellular radiotelephone system which broadcasts a System Identification Field including a Country Identifier. The Country Identifier identifies the particular country within which the AMPS system is located. Alternatively, the terrestrial communications system 215 may be a GSM cellular radiotelephone system which broadcasts a Mobile Country Code as part of the information which identifies the service provider. The Mobile Country Code identifies the particular country in which the GSM system is located. Although specific examples of the terrestrial communications system are given above, it should be understood that other systems which provide analogous information are within the scope of the present invention.

Figure 3A:
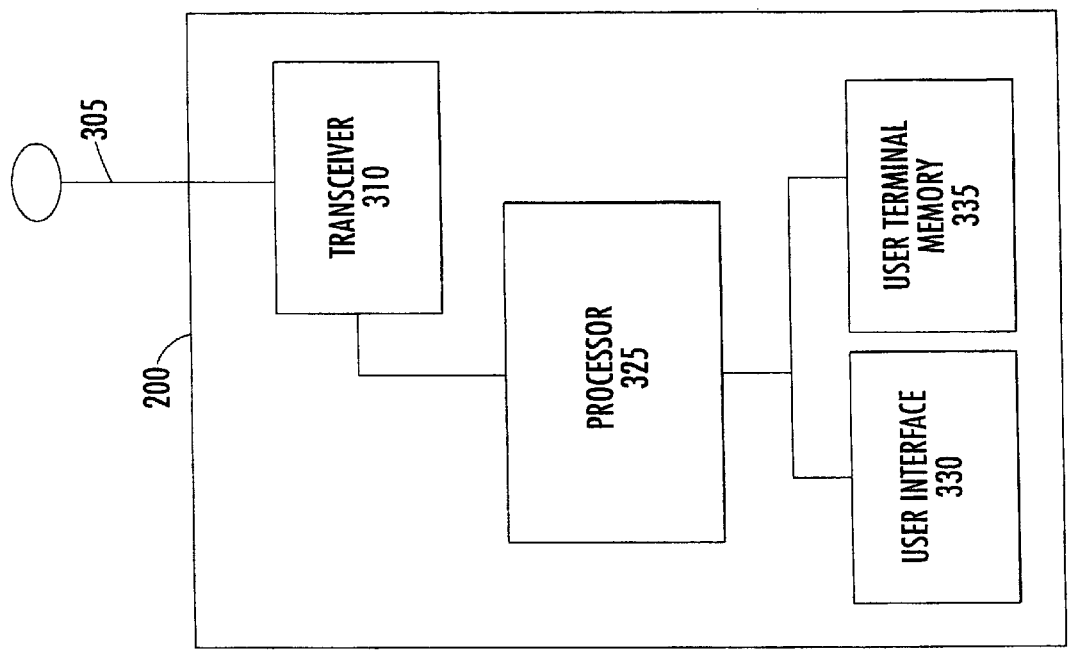
FIG. 3A is a block diagram of a user terminal according to the present invention.

Referring now to FIG. 3A, the user terminal 200 is a radiotelephone, such as a dual mode radiotelephone, capable of communicating with the satellite communications system and the terrestrial communications system 215. The user terminal 200 may operate as a satellite radiotelephone or the user terminal 200 may switch between satellite and terrestrial modes under user control or automatically. The user terminal 200 includes an antenna 305 and transceiver 310 for transmitting and receiving communications to/from the satellite system and/or the terrestrial system. The processor 325 accepts and provides information to and from the transceiver 310 and selects a control channel for the user terminal 200 to communicate with the satellite communications system. The user terminal memory 335 stores geographic information corresponding to spot beams within the satellite communications system and associated control channels. The user terminal memory 335 may be an internal memory (such as a non-volatile memory) or an external memory (such as a personal computer). The user interface 330 may include a key pad by which the user may control the operation of the user terminal 200. The processor 325, transceiver 310, and user terminal memory 355 may act in concert to provide an interface for the geographic information from the terrestrial communications system 215.

Figure 3B:
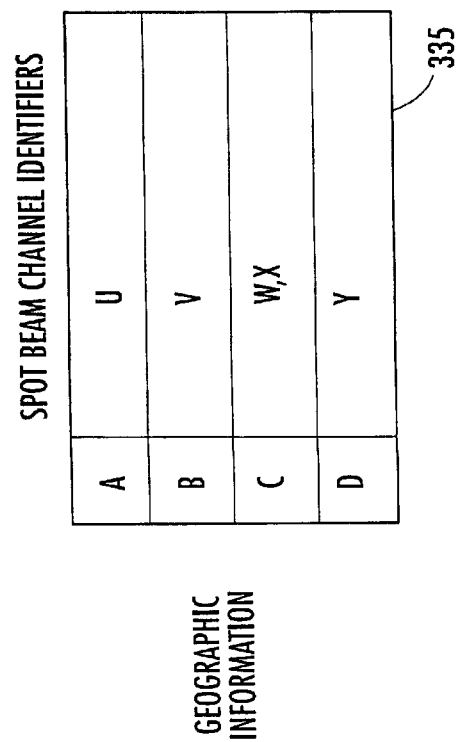
FIG. 3B is a data table which stores control channel information for access by user terminal of FIG. 3A.

FIG. 3B, illustrates the organization of the user terminal memory 335. The user terminal memory 335 stores spot beam control channel information (such as channel numbers) and the associated geographic information. For example, control channel identifier U is stored in the user terminal memory 335 which may be indexed using geographic information A. Therefore, the geographic information may be used to retrieve one or more control channels which correspond to the geographic information received from the terrestrial communications system 225. The user terminal memory 335 may be non-volatile so that the information described above may be maintained while the user terminal 200 is turned off.

Operations of the present invention will now be described with respect to FIGS. 4 to 7. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 4:
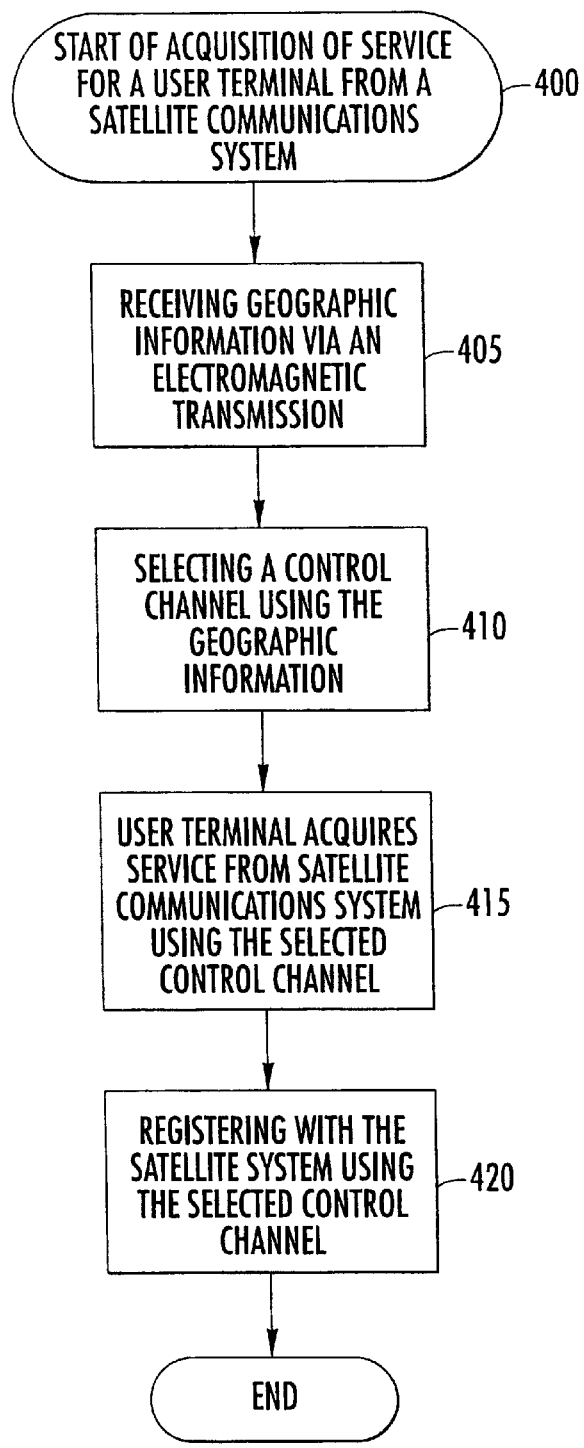
FIGS. 4 to 7 are flow charts illustrating operations of satellite systems according to the present invention.

FIG. 4 illustrates the acquisition of a service from a satellite communications system according to the present invention (block 400). The user terminal receives geographic information from a nearby terrestrial communications system via an electromagnetic transmission wherein the geographic information defines the location of the terrestrial system (block 405). The geographic information may comprise a Country Code or Mobile Country Code received from a cellular system. The terrestrial communications system may provide the geographic information faster than the systems according to the prior art because the signal strength of the terrestrial communications may be stronger than an analogous satellite signal. Moreover, the user terminal does not need to subscribe to the terrestrial service which provides the geographic information. Rather, the user terminal may determine the geographic information by monitoring the terrestrial communications system broadcast.

The user terminal selects a control channel which corresponds to one of the spot beams covering the user terminal's location using the geographic information provided (block 410). For example, the satellite communications system may broadcast system information including a list of spot beams and the corresponding control channels for each spot beam. The system information may be stored in the user terminal memory 335 during a preceding session wherein the user terminal was registered with the satellite communications system. Alternatively, the system information may be stored in the user terminal memory 335 during manufacturing or may be entered by the user. The user terminal 200 may then use the stored system information to select the proper spot beam control channel when provided with the geographic region by the terrestrial communications system. It should be understood that while selection of the control channel is described above with reference to a single control channel, the selection may provide multiple control channels wherein the geographic information indicates that multiple spot beams provide service to the geographic region.

The user terminal acquires service and may register with the satellite communications system using the control channel for the spot beam servicing the geographic region in which the user terminal is located (block 415). The user terminal uses the control channel to determine the LAC corresponding to the serving spot beam and, if necessary, generates a location update procedure which notifies the satellite system of the spot beam servicing the user terminal.

Figure 5:
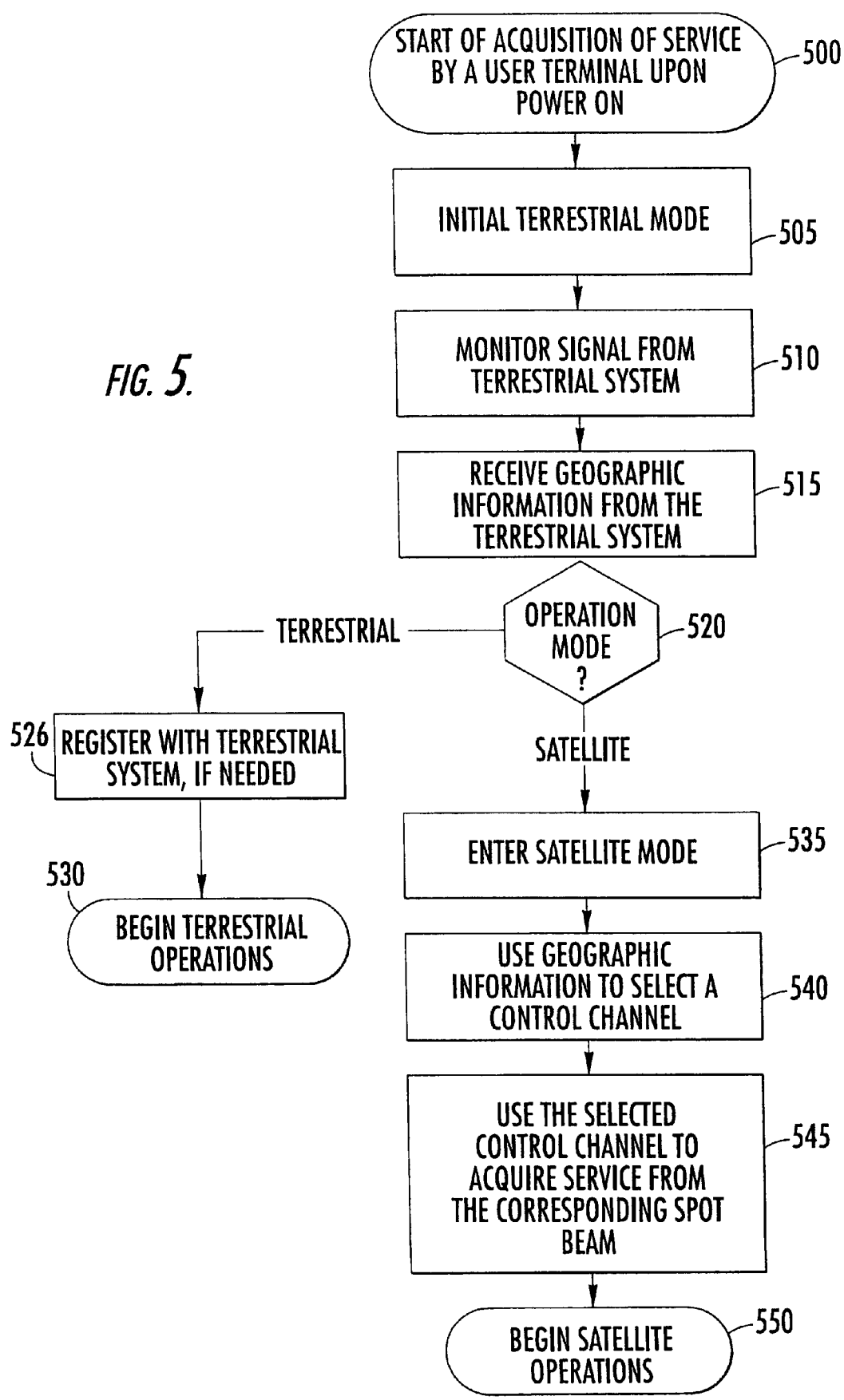

FIG. 5 illustrates the acquisition of service by a user terminal utilizing the present invention wherein the user terminal is provided with the geographic information after the user terminal is turned on (block 500). The user terminal initiates terrestrial mode (block 505) wherein the user terminal acquires a signal from the terrestrial communications system (block 510). The user terminal receives the system information from the terrestrial communications system (block 515) via the monitored signal and stores the geographic information.

A decision is made whether to operate the user terminal in terrestrial or satellite mode (block 520). The decision may be made by the user terminal or by the user. If terrestrial mode is selected the user terminal may register with the terrestrial communications system (block 525) and begin terrestrial operations (block 530). Referring back to block 520, if satellite mode is selected, the user terminal enters satellite mode (block 535) and uses the stored geographic information to select a control channel (block 540). The user terminal uses the selected control channel to acquire service from the corresponding spot beam (block 545). The user terminal then begins satellite operations(block 550).

Figure 6:
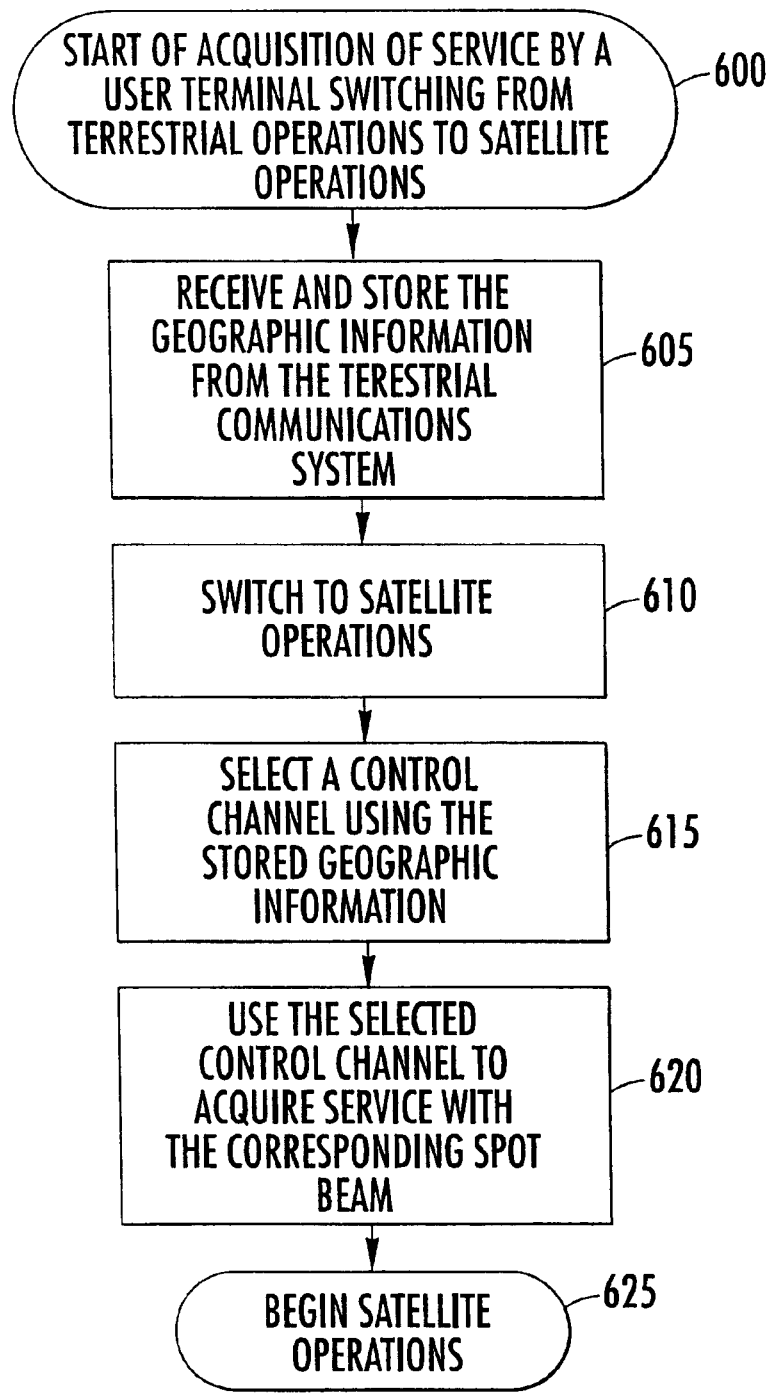

FIG. 6 illustrates the acquisition of service by a user terminal upon switching from terrestrial operations to satellite operations according to the present invention (block 600). The user terminal, operating in terrestrial mode, receives and stores the geographic information from the terrestrial communications system in the user terminal memory (block 605). The user terminal then switches to satellite mode (block 610). The switch may be initiated by the user terminal or by the user. The user terminal selects a control channel based on the stored geographic information (block 615). The user terminal acquires satellite communications system service using the selected control channel (block 620) and begins satellite operations (block 625).

Figure 7:
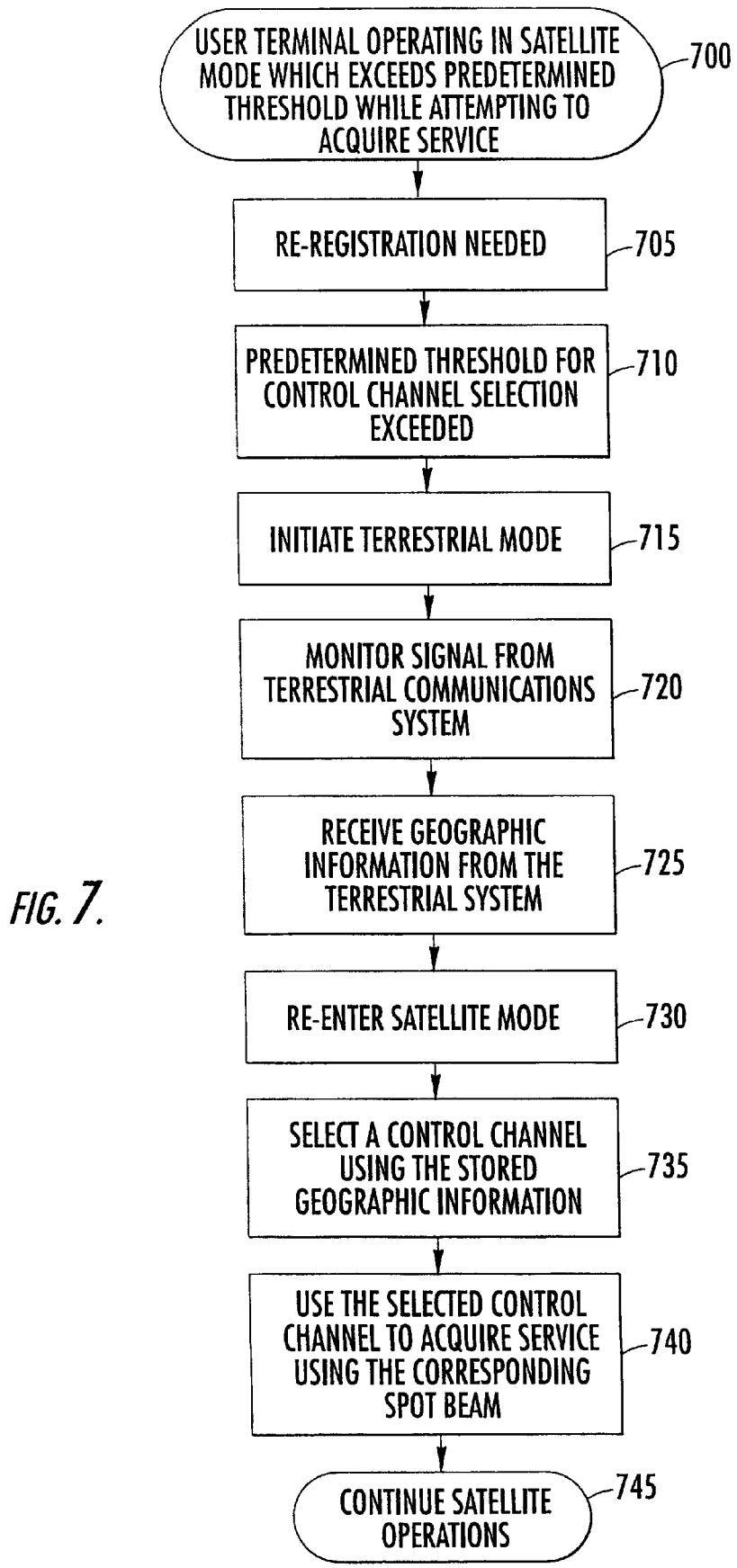

FIG. 7 illustrates a user terminal operating within a satellite communications system utilizing the present invention wherein the user terminal, operating in satellite mode, exceeds a predetermined threshold while attempting to acquire service with the satellite communication system (block 700). The user terminal detects that acquisition of service is necessary (block 705). The user terminal, however, is unsuccessful in determining the control channel for a serving spot beam (block 710) within a predetermined threshold time. For example, the user terminal may be programmed with a predetermined threshold time or number of control channels wherein if the predetermined threshold is exceeded, the user terminal determines the control channel as described below. The user terminal initiates terrestrial mode (block 715) and monitors the signal from the terrestrial communications system (block 720) and receives the geographic information needed to identify the location of the user terminal (block 725). The user terminal then re-enters satellite mode (block 730), wherein the user terminal selects a control channel based on the received geographic information (block 735), acquires service, and registers with the satellite communications system (block 740). The user terminal then begins satellite operations.

Receiving geographic information from the terrestrial cellular system may reduce the time needed to acquire service from a spot beam within a satellite communications system. Moreover, the present invention may not require the user to provide the user terminal with the information to reduce the search time, thereby reducing the likelihood of a user error which may interrupt service to the user terminal for longer periods of time. The present invention may also provide the advantages described herein without requiring the inclusion of additional hardware in the user terminal. For example, existing dual mode radiotelephones may be adapted to practice the methods and systems of the present invention. Consequently, existing dual mode radiotelephones may practice the methods and systems of the present invention without substantially increasing the hardware cost of the user terminal.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of acquiring service for a user terminal from a satellite communications system wherein the satellite communications system defines a plurality of spot beams with each of the spot beams providing service for a different geographic region, said method comprising the steps of:

receiving geographic information at the user terminal defining a location of the user terminal wherein the geographic information is received over a control channel of a terrestrial communications system;

selecting a satellite control channel corresponding to one of the spot beams covering said location of the user terminal using said geographic information; and acquiring said service for said user terminal from the satellite communications system over said satellite control channel.

2. A method according to claim 1 wherein a terrestrial communications system broadcasts the geographic information defining a location of the terrestrial communications system, and wherein said receiving step comprises receiving said geographic information from the terrestrial communications system.

3. A method according to claim 2 wherein the geographic information comprises a country identifier identifying a country within which the terrestrial communications system is located.

4. A method according to claim 1 wherein the user terminal includes a data table with a list of control channels corresponding to geographic locations and wherein said selecting step comprises indexing into the data table to select one of the control channels corresponding to the geographic information.

5. A method according to claim 1 wherein said selecting step comprises selecting a plurality of control channels corresponding to said geographic information.

6. A method according to claim 1 further comprising the step of registering said user terminal with the satellite communications system over said control channel.

7. A method according to claim 1 wherein said registering step comprises registering the user terminal with the spot beam covering said location of the user terminal.

8. A method according to claim 1 wherein said receiving step is preceded by the steps of:

attempting to acquire service for said user terminal from the satellite communications system for an associated predetermined threshold;

determining that the predetermined threshold associated with attempting to acquire service has been exceeded; and attempting to receive geographic information at the user terminal defining a location of the user terminal over the control channel of the terrestrial communications system.

9. A method according to claim 8 wherein the predetermined threshold includes at least one of a time limit or a number of control channels.

10. A method according to claim 2, wherein the terrestrial communications system comprises at least one of a GSM system and an AMPS system.

11. A user terminal for communicating with a satellite communications system wherein the satellite communications system defines a plurality of spot beams with each of the spot beams providing service for a different geographic region, said user terminal comprising:

a transceiver which transmits and receives communications to and from said satellite communications system, and which receives geographic information defining a location of the user terminal over a control channel of a terrestrial communications system;

a processor coupled to said transceiver which selects a satellite control channel corresponding to one of the spot beams covering said location of the user terminal using said geographic information, and which acquires service for said user terminal from the satellite communications system over said satellite control channel.

12. The user terminal according to claim 11 wherein a terrestrial communications system broadcasts the geographic information defining a location of the terrestrial communications system.

13. The user terminal according to claim 12 wherein the geographic information comprises a country identifier identifying a country within which the terrestrial communications system is located.

14. The user terminal according to claim 11 wherein the user terminal includes a data table with a list of control channels corresponding to geographic locations and wherein said processor indexes into the data table to select one of the control channels corresponding to the geographic information.

15. The user terminal according to claim 14 wherein said data table is stored in a user terminal memory wherein the user terminal memory may be internal or external to said user terminal.

16. The user terminal according to claim 11 wherein said processor selects a plurality of control channels corresponding to said geographic information.

17. The user terminal according to claim 11 wherein said processor registers the user terminal with the spot beam covering said location of the user terminal.

18. The user terminal according to claim 11 wherein said processor attempts to acquire service for said user terminal from the satellite communications system for an associated predetermined threshold and determines whether the predetermined threshold associated with attempts to acquire service has been exceeded and that attempts to receive geographic information at the user terminal defining a location of the user terminal over the control channel of the terrestrial communications system if the associated predetermined threshold has been exceeded.

19. The user terminal according to claim 18 wherein the predetermined threshold includes at least one of a time limit or a number of control channels.

20. A user terminal for communicating with a satellite communications system wherein the satellite communications system defines a plurality of spot beams with each of the spot beams providing service for a different geographic region, said user terminal comprising:

transceiver means for transmitting and receiving communications to and from said satellite communications system and receiving geographic information defining a location of the user terminal over a control channel of a terrestrial communications system; and processor means coupled to said transceiver means for selecting a satellite control channel corresponding to one of the spot beams covering said location of the user terminal using said geographic information, and acquiring the service for said user terminal from the satellite communications system over said satellite control channel.

21. The user terminal according to claim 20 wherein a terrestrial communications system broadcasts the geographic information defining a location of the terrestrial communications system.

22. The user terminal according to claim 21 wherein the geographic information comprises a country identifier identifying a country within which the terrestrial communications system is located.

23. The user terminal according to claim 20 wherein the user terminal includes a data table with a list of control channels corresponding to geographic locations and wherein said processor means comprises indexing means for accessing a data table to select one of the control channels corresponding to the geographic information.

24. The user terminal according to claim 23 wherein the data table may be external or internal to the user terminal.

25. The user terminal according to claim 20 wherein said processor means selects a plurality of control channels corresponding to said geographic information.

26. The user terminal according to claim 20 wherein said processor means registers the user terminal with the spot beam covering said location of the user terminal.

27. The user terminal according to claim 20 wherein said processor means attempts to acquire service for said user terminal from the satellite communications system for an associated predetermined threshold and determines whether the predetermined threshold associated with attempts to acquire service has been exceeded and that attempts to receive geographic information at the user terminal defining a location of the user terminal over the control channel of the terrestrial communications system if the associated predetermined threshold has been exceeded.

28. The user terminal according to claim 27 wherein the predetermined threshold includes at least one of a time limit or a number of control channels.

29. A method of acquiring service for a user terminal from a satellite communications system wherein the satellite communications system defines a plurality of spot beams with each of the spot beams providing service for a different geographic region, said method comprising the steps of:

attempting to acquire service for said user terminal from the satellite communications system for an associated predetermined threshold;

determining whether the associated predetermined threshold has been exceeded;

receiving geographic information at the user terminal defining a location of the user terminal wherein the geographic information is received over a control channel of a terrestrial communications system if the associated predetermined threshold has been exceeded;

selecting a satellite control channel corresponding to one of the spot beams covering said defined location of the user terminal using said received geographic information; and acquiring said service for said user terminal from the satellite communications system over said selected satellite control channel.

* * * * *